(12) United States Patent
Tashiro et al.

(10) Patent No.: US 6,873,366 B2
(45) Date of Patent: Mar. 29, 2005

(54) TIMING GENERATOR FOR SOLID-STATE IMAGING DEVICE

(75) Inventors: Shinichi Tashiro, Osaka (JP); Katsumi Takeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 778 days.

(21) Appl. No.: 09/788,504

(22) Filed: Feb. 21, 2001

(65) Prior Publication Data

US 2002/0135690 A1 Sep. 26, 2002

(30) Foreign Application Priority Data

Feb. 21, 2000 (JP) ........................................ 2000-042193

(51) Int. Cl.$^7$ .............................. G06F 1/06; G06F 1/08; H04N 5/335; H04N 5/228
(52) U.S. Cl. .................... 348/312; 348/524; 348/222.1; 348/296; 713/400; 713/501
(58) Field of Search ................................ 348/312, 524, 348/222.1, 295, 296, 302, 303, 304, 316, 523; 713/502, 501, 400, 600

(56) References Cited

U.S. PATENT DOCUMENTS

| | | | | |
|---|---|---|---|---|
| 4,907,089 A | * | 3/1990 | Yamaguchi et al. | 348/312 |
| 4,980,770 A | * | 12/1990 | Dujardin | 348/312 |
| 6,124,889 A | * | 9/2000 | Landowski | 348/312 |
| 6,285,399 B1 | * | 9/2001 | Tao | 348/312 |
| 6,329,982 B1 | * | 12/2001 | Lee | 348/312 |
| 6,593,963 B1 | * | 7/2003 | Safai | 348/312 |
| 6,680,751 B1 | * | 1/2004 | Kubo et al. | 348/312 |
| 2001/0050713 A1 | * | 12/2001 | Kubo et al. | 348/312 |

FOREIGN PATENT DOCUMENTS

| | | | | |
|---|---|---|---|---|
| EP | 54159 A2 | * | 6/1982 | ............ G06F/1/04 |
| JP | 62026920 A | * | 2/1987 | .......... H03K/5/156 |
| JP | 63054876 A | * | 3/1988 | ............ H04N/3/15 |
| JP | 63-061560 | | 3/1988 | |
| JP | 02159989 A | * | 6/1990 | ............ H02P/5/00 |
| JP | 06261174 A | * | 9/1994 | .......... H04N/1/028 |
| JP | 09-205591 | | 8/1997 | |
| JP | 10-257398 | | 9/1998 | |
| JP | 11102231 A | * | 4/1999 | ............ G06F/1/06 |

* cited by examiner

*Primary Examiner*—Aung Moe
*Assistant Examiner*—John Villecco
(74) *Attorney, Agent, or Firm*—McDermott Will & Emery LLP

(57) ABSTRACT

To reduce the amount of data that should be stored on a memory-built-in timing generator for generating timing pulses for use to drive a solid-state imaging device, V- and H-counters, three ROMs, V- and H-comparators and combinatorial logic circuit are provided. The V- and H-counters perform a count operation responsive to vertical and horizontal sync signal pulses as respective triggers. One of the ROMs stores time-series data representing a logical level repetitive pattern of an output pulse train. The other two ROMs store edge data representing at what counts of the V- and H-counters control pulses should change their logical levels. The V- and H-comparators and the combinatorial logic circuit change the logical levels of the control pulses when the counts of the V- and H-counters match the edge data. The comparators and logic circuit also output, as the timing pulses, results of logical operations performed on the output pulse train, represented by the time-series data, and the control pulses.

9 Claims, 9 Drawing Sheets

FIG. 6

TIME-SERIES DATA

|    | V1 | V2 | V3 | V4 |
|----|----|----|----|----|
| T1 | 0  | 0  | 1  | 1  |
| T2 | 1  | 0  | 0  | 1  |
| T3 | 1  | 1  | 0  | 0  |
| T4 | 0  | 1  | 1  | 0  |
| T5 | 0  | 0  | 1  | 1  |

⋮

TIMING GENERATOR FOR SOLID-STATE IMAGING DEVICE

BACKGROUND OF THE INVENTION

The present invention relates to a timing generator that generates timing pulses for use to drive a solid-state imaging device.

Camcorders and digital still cameras, including a solid-state imaging device like a CCD, have been known. The time it takes to develop cameras of those types has been shortened and the price thereof has also been brought down. Naturally, their components also have to meet similar types of demands, and also need to be developed in a shorter time and have their costs cut down.

A timing generator is an important component that generates a great number of timing pulses for use to drive a solid-state imaging device.

A timing generator, which includes: a memory for storing time-series data representing a pattern of timing pulses thereon to cope with a change to specifications easily; and a counter for sequentially supplying read addresses to this memory, is disclosed in Japanese Laid-Open Publication No. 63-61560.

A timing generator, retrieving multiple horizontally repetitive timing pulses and multiple vertically repetitive pulses from mutually different memories to cut down the memory capacity, is disclosed in Japanese Laid-Open Publication No. 9-205591.

A timing generator, including a decoder for decoding leading pulses and another decoder for decoding trailing pulses to set timing pulses programmably using a microcomputer, is disclosed in Japanese Laid-Open Publication No. 10-257398.

Timing pulses for use to drive a solid-state imaging device are in huge numbers and have a complicated waveform. Accordingly, none of these known timing generators is free from the problems of an enormous amount of data to be stored and a troublesome data setting procedure.

SUMMARY OF THE INVENTION

An object of the present invention is to reduce the amount of data that should be stored on a timing generator, including a built-in memory, for generating timing pulses for use to drive a solid-state imaging device.

To achieve this object, the present invention stores repetitive pulse patterns themselves as time-series data for several types of timing pulses that change in mutually correlated manners. As for timing pulses that should be set on an individual basis, the present invention stores the addresses of the leading and trailing edges thereof as edge data.

Specifically, the present invention is a timing generator for generating timing pulses for use to drive a solid-state imaging device. The timing generator is configured to include: a first counter for performing a count operation responsive to each pulse of a vertical sync signal as a trigger; a second counter for performing a count operation responsive to each pulse of a horizontal sync signal as a trigger; a time-series data memory for storing time-series data that represents a logical level repetitive pattern of an output pulse train; edge data storage for storing edge data that represents at what counts of the first and second counters control pulses should change their logical levels; and means for changing the logical levels of the control pulses when the counts of the first and second counters match the edge data and for outputting, as the timing pulses, results of logical operations performed on the output pulse train, represented by the time-series data, and the control pulses.

BRIEF DESCRIPTION OF THE DRAWINGS

FIG. 6 illustrates exemplary data stored on the time-series data ROM shown in FIG. 3.

DETAILED DESCRIPTION OF THE INVENTION

Figure 1:
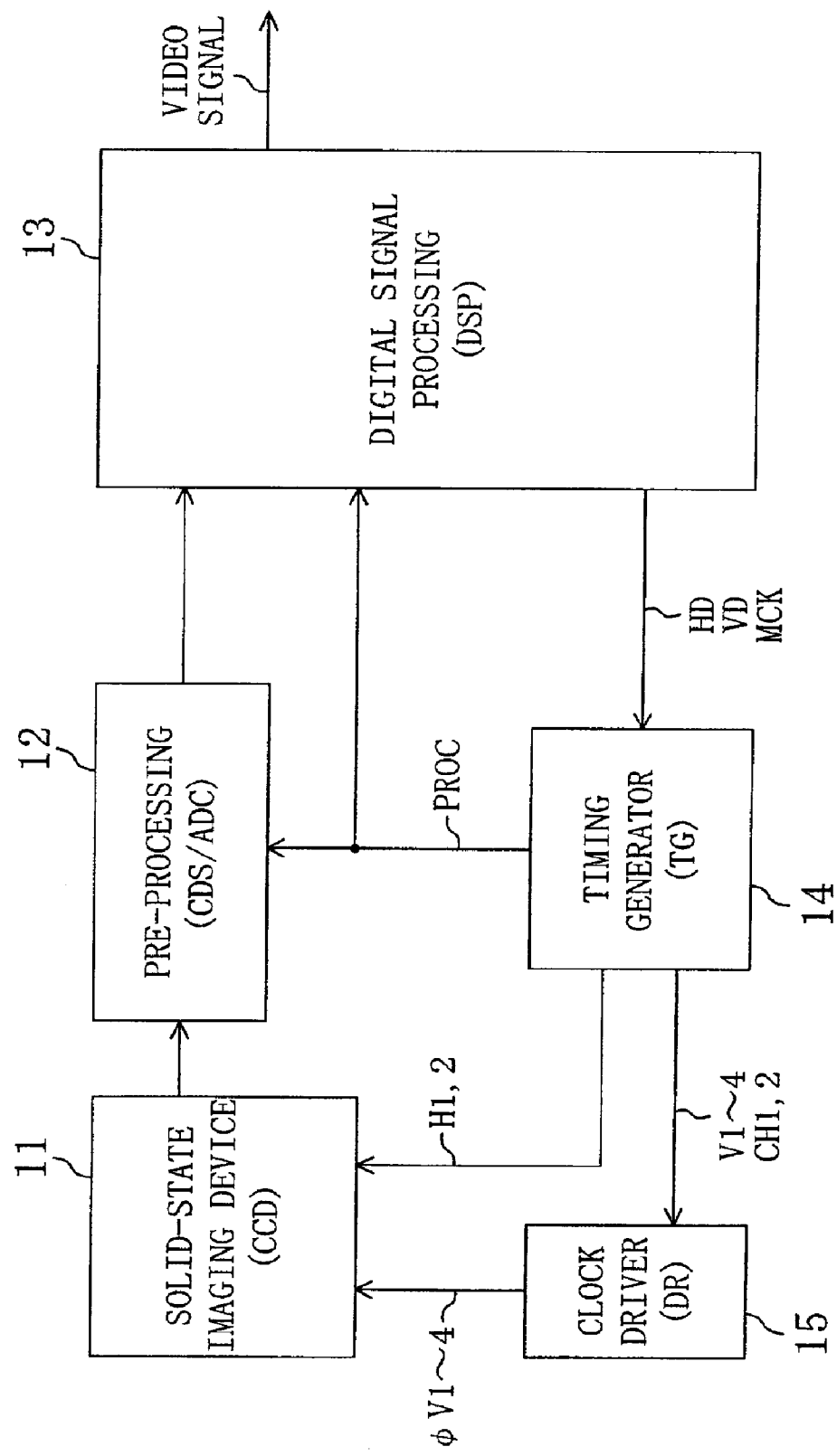
FIG. 1 is a block diagram illustrating a schematic configuration for a CCD camera including a timing generator according to the present invention.

FIG. 1 illustrates a schematic configuration for a CCD camera including a timing generator according to the present invention. In FIG. 1, the reference numeral 11 denotes a solid-state imaging device (e.g., a CCD). 12 denotes a pre-processing LSI for performing CDS (correlated double sampling) and ADC (analog-to-digital conversion) processing. 13 denotes a digital signal processing (DSP) LSI that performs pixel interpolation and luminance/chrominance processing to output a video signal. 14 denotes a timing generator (TG) LSI for generating timing pulses H1, H2, V1 through V4, CH1 and CH2 for use to drive the solid-state imaging device 11. And 15 denotes a clock driver (DR) LSI for supplying drive pulses φV1 through φV4, produced from V1 through V4, CH1 and CH2, to the solid-state imaging device 11. The timing generator 14 is supplied with pulses of horizontal sync signal HD, vertical sync signal VD and clock signal MCK from the digital signal processing LSI 13 to generate the timing pulses H1, H2, V1 through V4, CH1 and CH2. The timing generator 14 also supplies a signal processing pulse PROC to the pre-processing and digital signal processing LSIs 12 and 13. It should be noted that the timing generator 14 may generate the pulses of the horizontal and vertical sync signals. In the following illustrative embodiment, the present invention will be described as being applied to drive pulses for the solid-state imaging device 11. However, the present invention is also applicable to generating pulses other than the timing pulses for use to drive the solid-state imaging device 11.

Figure 2:
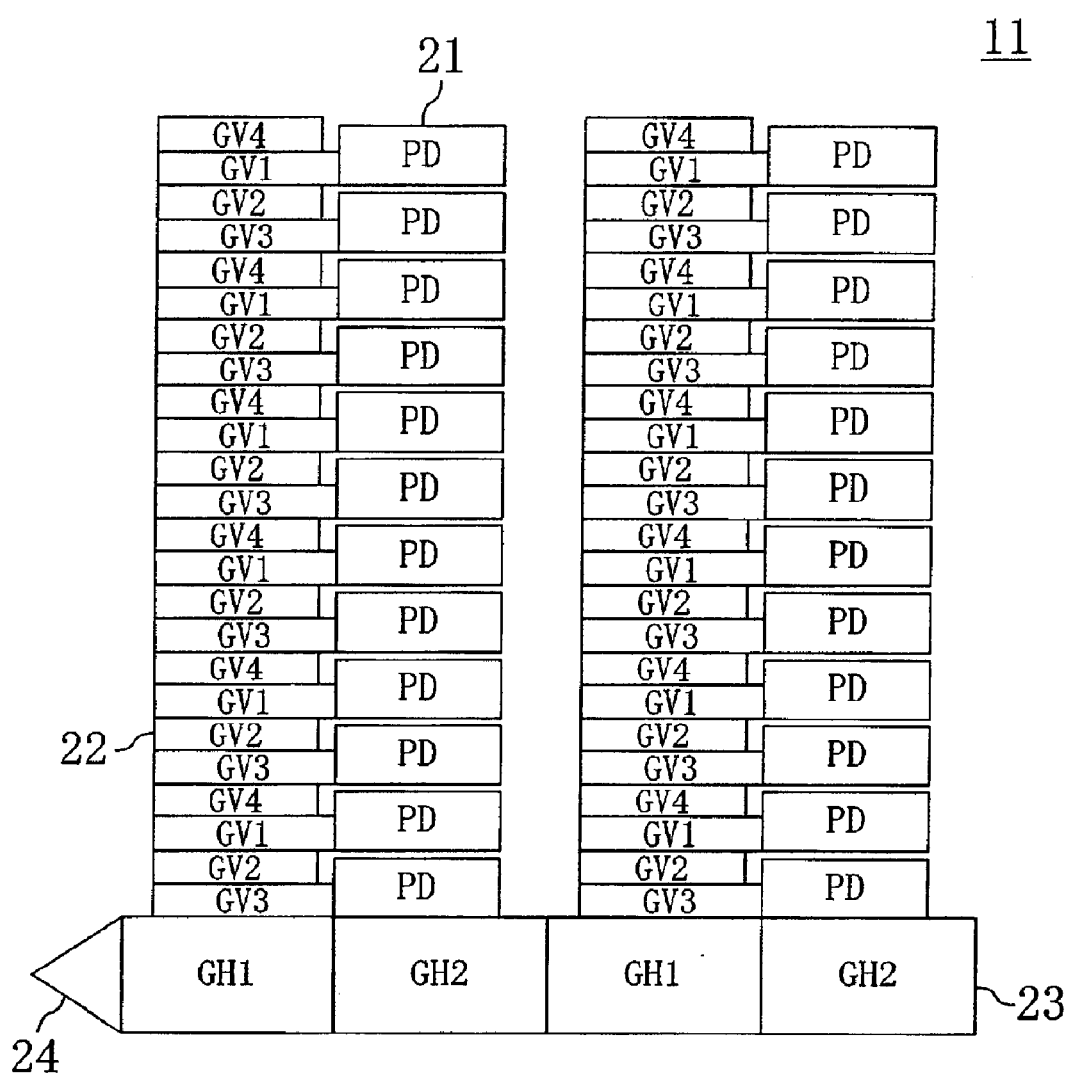
FIG. 2 is a schematic representation illustrating how gates may be arranged in the solid-state imaging device (CCD) shown in FIG. 1.

FIG. 2 illustrates how gates may be arranged in the solid-state imaging device 11 shown in FIG. 1. In FIG. 2, the reference numeral 21 denotes photodiodes (PD) 21. 22 denotes vertical transfer sections, each made up of four-phase gates GV1, GV2, GV3 and GV4. 23 denotes a horizontal transfer section made up of two-phase gates GH1 and GH2. And 24 denotes a charge sensing section. The photodiodes 21 and vertical transfer sections 22 are illustrated in FIG. 2 as simplified ones. In an actual solid-state imaging device 11, however, the same number of photodiodes 21/vertical transfer section 22 combinations as that of the horizontal pixels are arranged. In each vertical transfer section 22, multiple sets of gates GV1 through GV4 are repeatedly arranged vertically in the order of GV3, GV2, GV1 and GV4 as enumerated upward from the horizontal transfer section 23. The drive pulses $\phi V1$ through $\phi V4$ shown in FIG. 1 are supplied to the gates GV1 through GV4 of each vertical transfer section 22, respectively. On the other hand, the timing pulses H1 and H2 shown in FIG. 1 are supplied to the gates GH1 and GH2 of the horizontal transfer section 23, respectively.

A method for reading the solid-state imaging device 11 shown in FIG. 2 may be as follows. Specifically, by applying the drive pulse $\phi V1$ with a high voltage (of about 15 V) to GV1 in the vertical transfer sections 22, charges are read out from the photodiodes 21 onto the vertical transfer sections 22. And by applying the drive pulses $\phi V1$ through $\phi V4$ to the gates GV1 through GV4 in the vertical transfer sections 22, the charges, corresponding to one row of photodiodes 21, are transferred at a time to the horizontal transfer section 23 once every horizontal scanning period. Then, the timing pulses H1 and H2 are applied to the horizontal transfer section 23, thereby transferring the charges through the horizontal transfer section 23 and outputting a signal through the charge sensing section 24.

Figure 3:
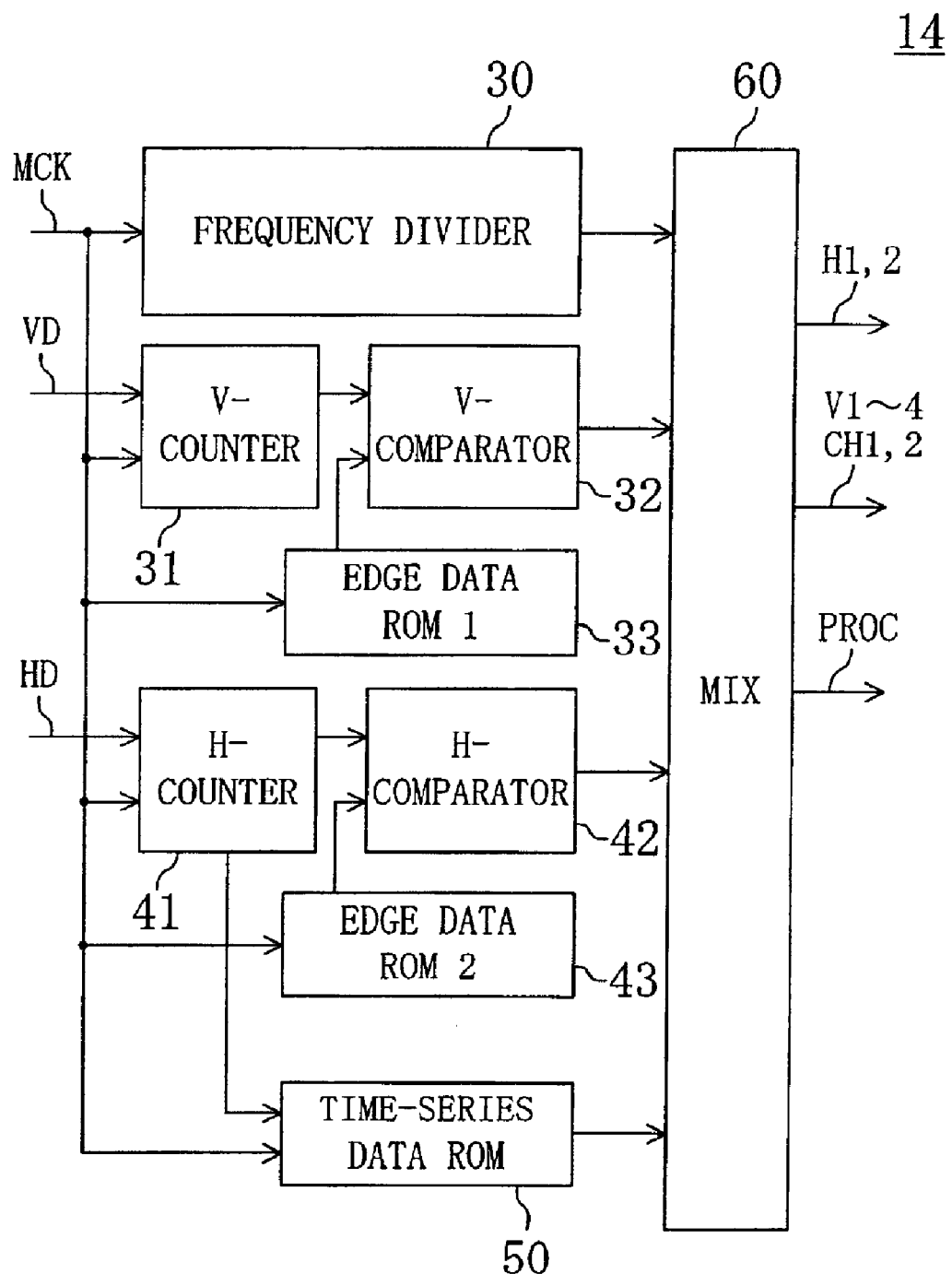
FIG. 3 is a block diagram illustrating an exemplary internal configuration for the timing generator shown in FIG. 1.

FIG. 3 illustrates an exemplary internal configuration for the timing generator 14 shown in FIG. 1. The timing generator 14 shown in FIG. 3 includes frequency divider 30, V- and H-counters 31 and 41, V- and H-comparators 32 and 42, first and second edge data ROMs 33 and 43, time-series data ROM 50 and combinatorial logic circuit (MIX) block 60. The frequency divider 30 divides the frequency of the clock signal MCK. The V-counter 31 performs a count operation responsive to a pulse of the vertical sync signal (VD pulse) as a trigger. The H-counter 41 performs a count operation responsive to a pulse of the horizontal sync signal (HD pulse) as a trigger. The V- and H-comparators 32 and 42 determine whether or not the counts of the V- and H-counters 31 and 41 have matched the data stored on the first and second edge data ROMs 33 and 43, respectively. The first and second edge data ROMs 33 and 43 are memories for storing data representing at what counts of the V- and H-counters 31 and 41 control pulses should change their logical levels. The time-series data ROM 50 is a memory for storing data representing the logical level repetitive pattern of an output pulse train. The ROM 50 also accepts the counts of the H-counter 41 as read addresses. The MIX block 60 performs logical operations on the respective outputs of the frequency divider 30, V- and H-comparators 32 and 42 and times-series data ROM 50, thereby changing the logical levels of the control pulses when the counts of the V- and H-counters 31 and 41 match the predetermined edge data. The block 60 also outputs, as timing pulses, results of logical operations performed on the output pulse train, represented by the data stored on the time-series data ROM 50, and the control pulses.

Figure 4:
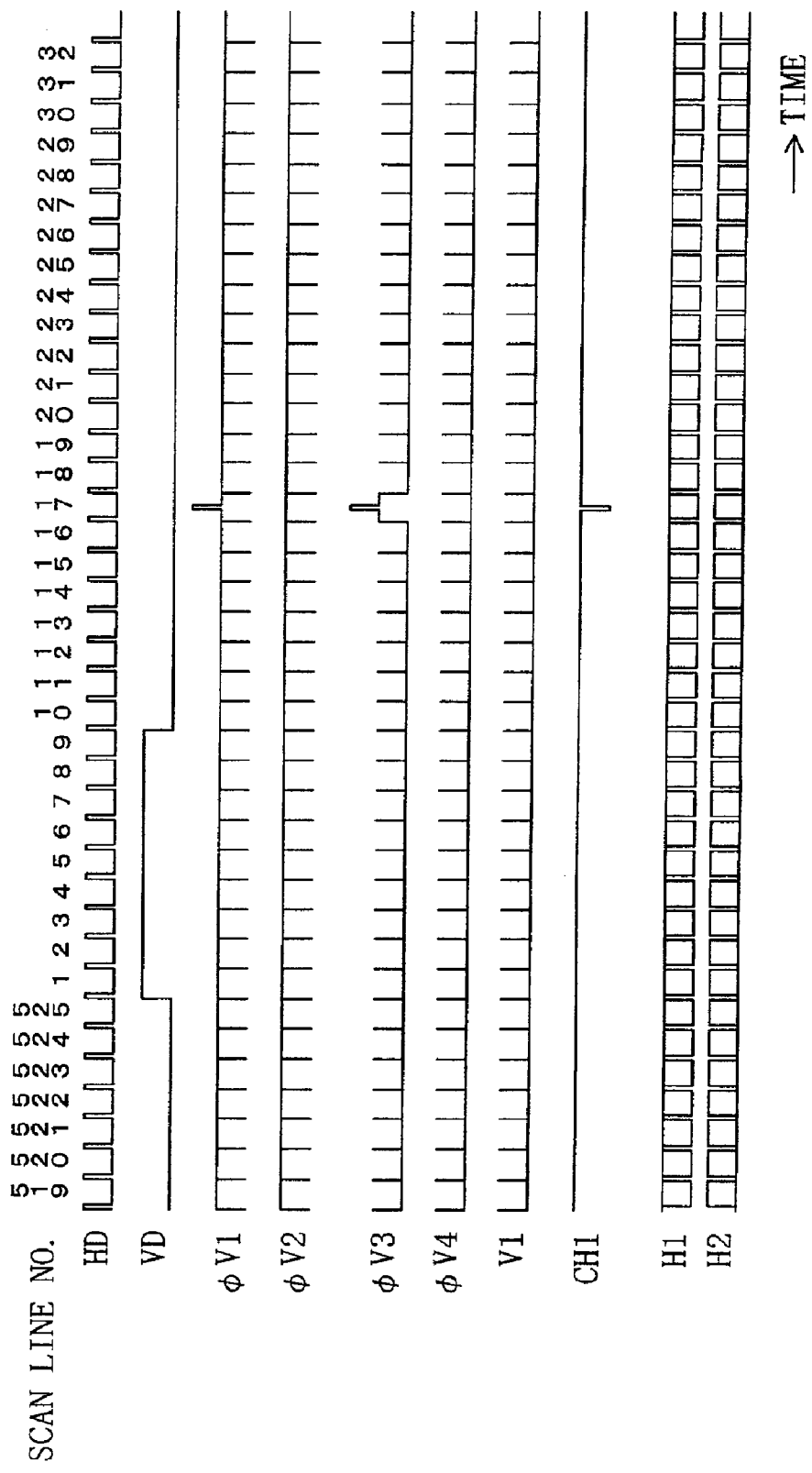
FIG. 4 is a timing chart illustrating exemplary waveforms for main signals shown in FIG. 1.

FIG. 4 illustrates exemplary waveforms (in the vicinity of a VD pulse) for main signals shown in FIG. 1. In FIG. 4, V1 and CH1 are the timing pulses, which are output from the timing generator 14, are transformed into three-valued representations and have their voltage converted by the clock driver 15 so as to be the drive pulse $\phi V1$. V2 through V4 (not shown) also have their voltage converted by the clock driver 15 so as to be $\phi V2$ through $\phi V4$, respectively.

Figure 5:
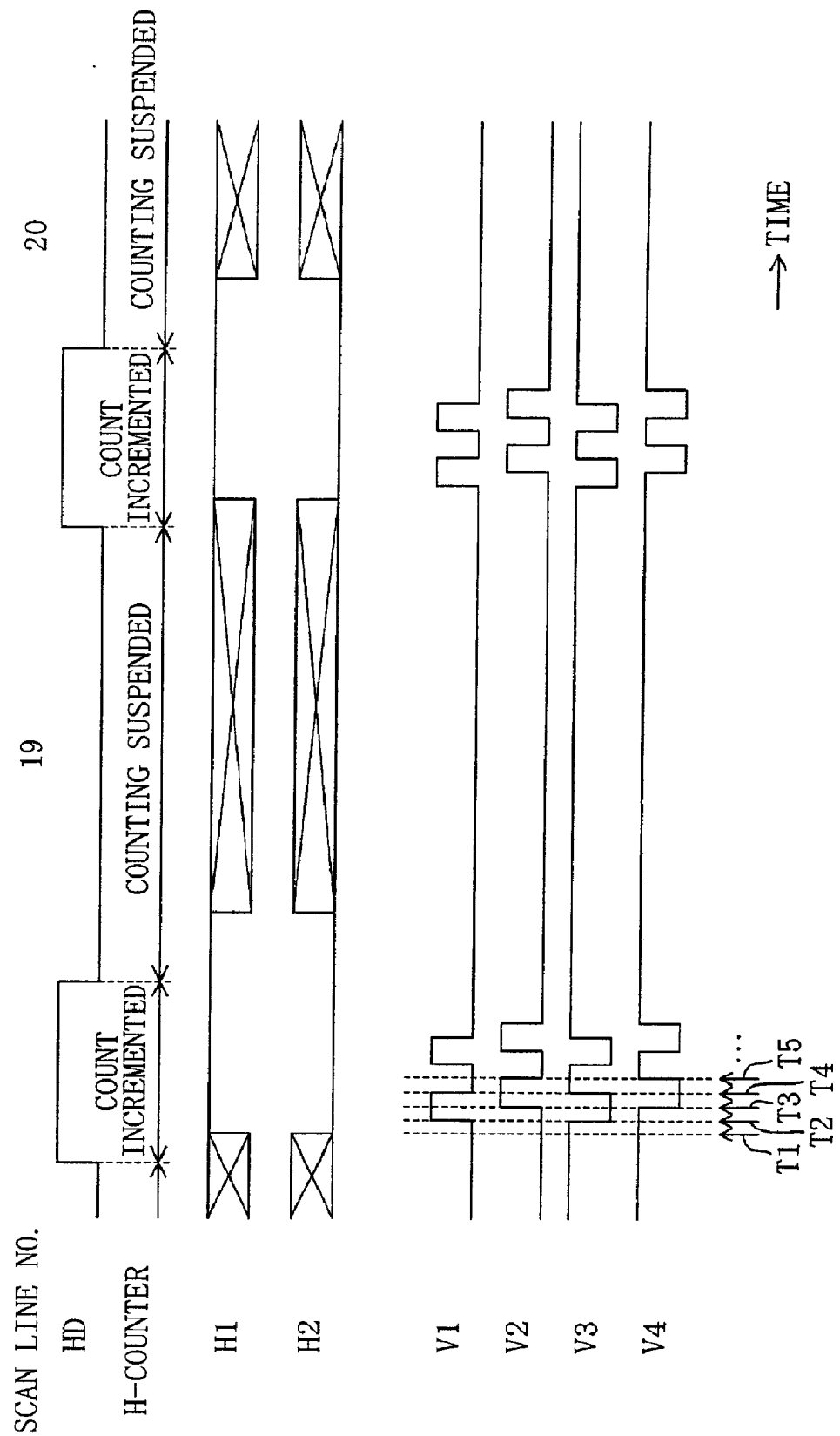
FIG. 5 is a timing chart illustrating an exemplary operation of the timing generator shown in FIG. 3.

FIG. 5 illustrates, to a larger scale, part of FIG. 4 (around scan lines Nos. 19 and 20) in which the same pulses are output every time an HD pulse is input. As shown in FIG. 5, the pulses V1 through V4, which are output repeatedly every time an HD pulse is input, are generated using the time-series ROM 50.

FIG. 6 illustrates the data (for generating the pulses V1 through V4) stored on the time-series ROM 50 for the times T1 through T5 shown in FIG. 5.

Figure 7:
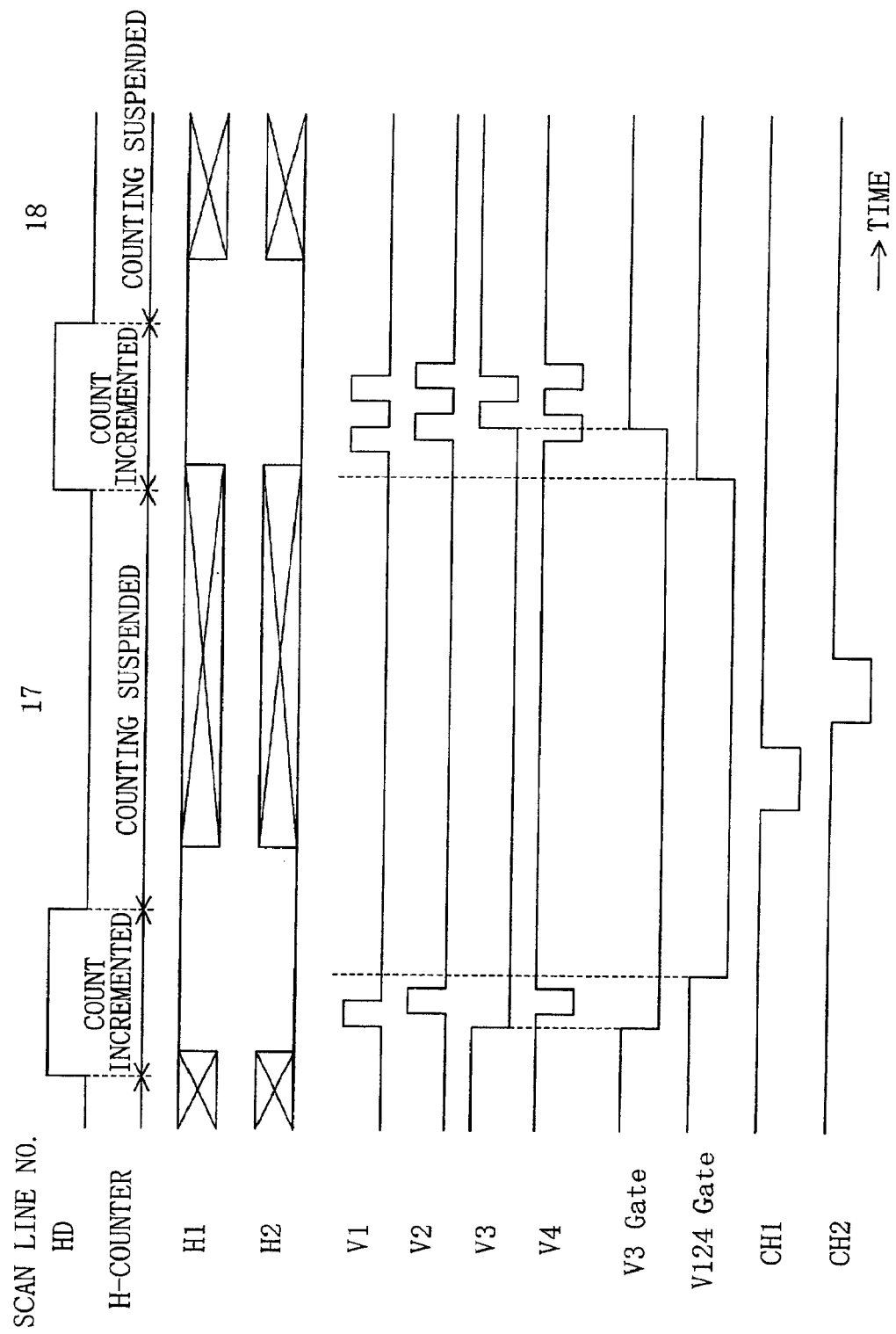
FIG. 7 is a timing chart illustrating another exemplary operation of the timing generator shown in FIG. 3.

FIG. 7 illustrates, to a larger scale, part of FIG. 4 (around scan lines Nos. 17 and 18) in which charges are read out from the photodiodes 21 onto the vertical transfer section 22. V3 Gate and V124 Gate are control pulses for use in the MIX block 60, and are generated by the V- and H-comparators 32 and 42 from the data stored on the first and second edge data ROMs 33 and 43. Then, the MIX block 60 performs a logical (AND) operation on V3 Gate and V3, which is output from time-series data ROM 50, to obtain V3 shown in FIG. 7. As for V1 and V2, the MIX block 60 also performs a logical (AND) operation on V124 Gate and V1 or V2, which is output from the time-series data ROM 50, to obtain V1 and V2 shown in FIG. 7. And for V4, the MIX block 60 performs a logical (OR) operation on a signal, which is obtained by inverting the logical level of V124 Gate, and V4 output from the time-series data ROM 50 to obtain V4 shown in FIG. 7.

As described above, the generator shown in FIG. 3 uses the data stored on the time-series data ROM 50 for frequently repetitive, complicated pulses. But the generator uses the leading/trailing data stored on the first and second edge data ROMs 33 and 43 for less frequently repetitive pulses. In this manner, increase in the amount of data to be stored on the memory is avoidable.

It should be noted that if the read timings (e.g., start points, period of logical level changes and clock end points) of the time-series data ROM 50 are set by the first and second edge data ROMs 33 and 43, then the amount of data to be stored on the time-series data ROM 50 can be reduced considerably.

Figure 8:
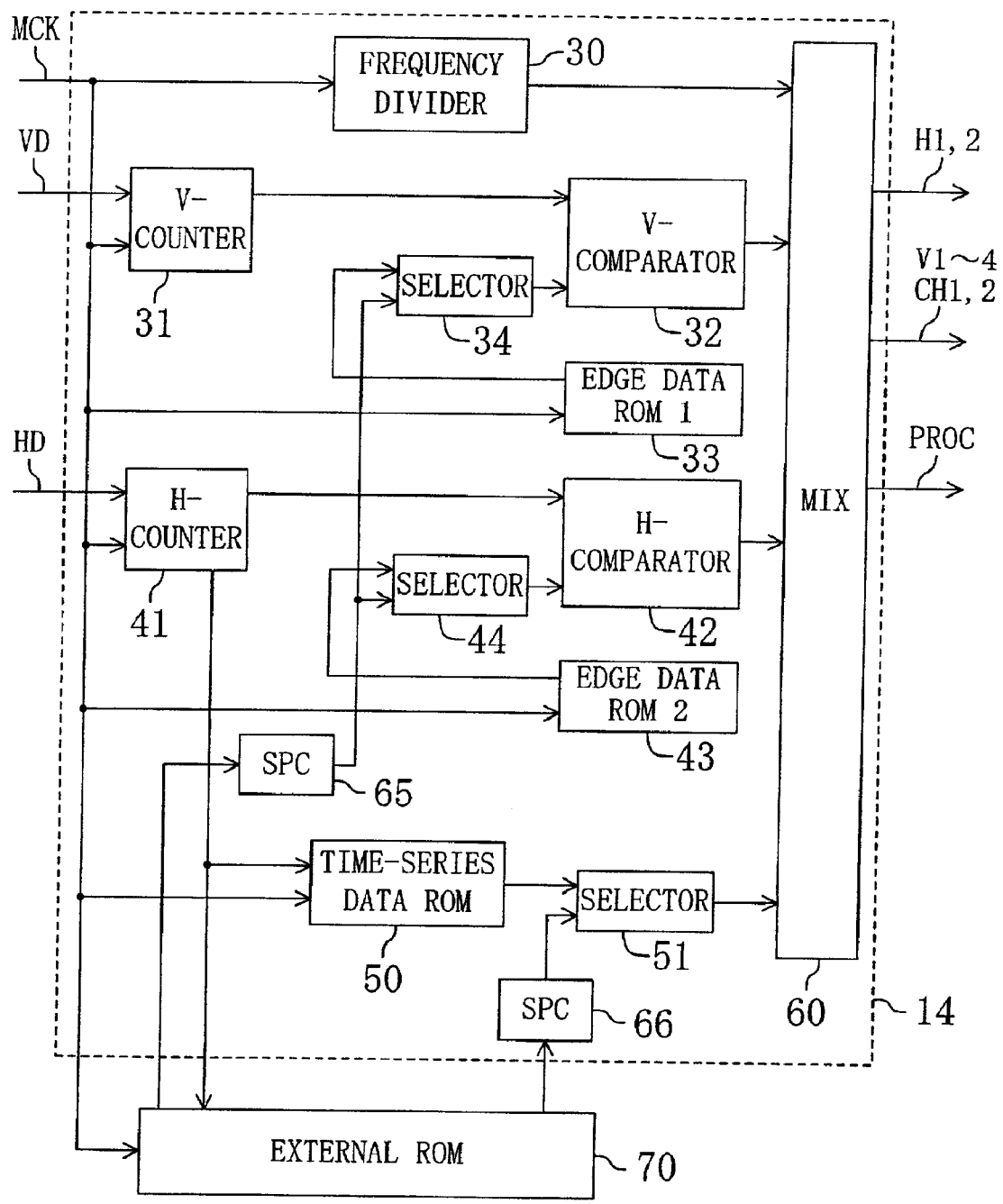
FIG. 8 is a block diagram illustrating a modified example of the timing generator shown in FIG. 3.

FIG. 8 illustrates a modified example of the timing generator 14 shown in FIG. 3. The timing generator 14 shown in FIG. 8 and an external ROM 70 together constitute a timing generator system. And the timing generator 14 further includes blocks 34, 44 and 51 having a selector function and blocks 65 and 66 having an SPC (serial-to-parallel conversion) function in addition to all the components shown in FIG. 3. The external ROM 70 is a memory that outputs serial data and that stores second edge data as an alternative to first edge data stored on the first and second edge data ROMs 33 and 43 and second time-series data as an alternative to first time-series data stored on the time-series data ROM 50, respectively. The selectors 34 and 44 each select either the first or second edge data. The selector 51 selects either the first or second time-series data. Accordingly, when the counts of the V- and H-counters 31 and 41 match the first or second edge data, the control pulses change their logical levels. And results of logical operations, performed on the output pulse train, represented by the first or second time-series data, and the control pulses, are output as timing pulses.

In the configuration shown in FIG. 8, even after the timing generator 14 is completed, a timing to drive the solid-state imaging device 11 still can be changed using the external ROM 70. This configuration is effective particularly when there is just a short time allowed for modifying part of the generator or developing the generator itself. In addition, since the external ROM 70 is a ROM outputting serial data, this configuration is implementable without increasing the number of terminals of the timing generator 14 so much.

While the data stored on the external ROM 70 is transferred to the timing generator 14, a current flows through address and clock lines to read it. A current also flows when a logical level changes at an input/output buffer responsive to the input of the data corresponding to the address. If the current flows when a pixel signal is output from the solid-state imaging device 11, this current will make noise through H1 and H2 and pulses for the pre-processing LSI 12. To avoid this situation, a signal is transmitted between the timing generator 14 and the external ROM 70 when the system is powered up or while no effective pixel signals are output from the solid-state imaging device 11, e.g., a blanking interval just after a horizontal or vertical sync signal has been supplied.

Figure 9:
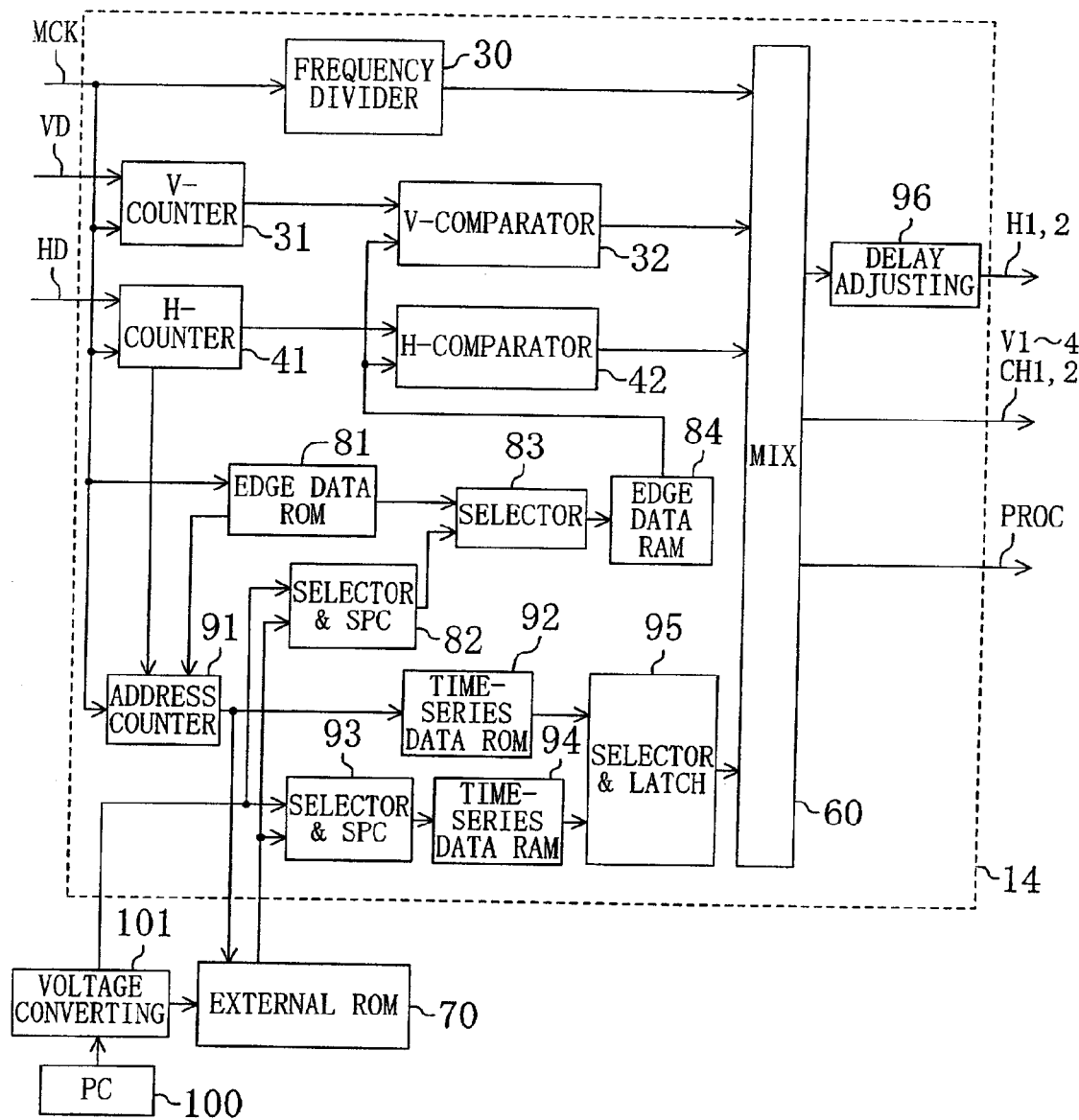
FIG. 9 is a block diagram illustrating another modified example of the timing generator shown in FIG. 3.

FIG. 9 illustrates another modified example of the timing generator 14 shown in FIG. 3. The timing generator 14 shown in FIG. 9, an external ROM 70 and a personal computer (PC) 100 together constitute a timing generator system. The timing generator 14 is comprised of frequency divider 30, V- and H-counters 31 and 41, V- and H-comparators 32 and 42, edge data ROM 81, address counter 91, time-series data ROM 92, blocks 82 and 93 each having selector and SPC functions, block 83 having a selector function, edge data RAM 84, time-series data RAM 94, block 95 having selector and latch functions, MIX block 60 and delay adjusting block 96. The external ROM 70 is a memory that outputs serial data and that stores second edge data as an alternative to first edge data stored on the edge data ROM 81 and second time-series data as an alternative to first time-series data stored on the time-series data ROM 92, respectively. The PC 100 is a computer that outputs serial data and that stores third edge data as another alternative to the first edge data stored on the edge data ROM 81 and third time-series data as another alternative to the first time-series data stored on the time-series data ROM 92, respectively. The PC 100 is connected to the timing generator 14 and external ROM 70 by way of a voltage converting block 101. The selectors 82 and 83 each select the first, second or third edge data. The selectors 93 and 95 each select the first, second or third time-series data. Accordingly, when the counts of the V- and H-counters 31 and 41 match the first, second or third edge data, the control pulses change their logical levels. And results of logical operations, performed on an output pulse train, represented by the first, second or third time-series data, and the control pulses, are output as the timing pulses. The edge data RAM 84 is a RAM that stores the first, second or third edge data. The time-series data RAM 94 is a RAM that stores the second or third time-series data. And the latch 95 stores the first, second or third time-series data.

In the configuration shown in FIG. 9, even after the timing generator 14 is completed, a timing to drive the solid-state imaging device 11 can be changed using either the external ROM 70 or PC 100. This configuration is effective particularly when there is just a short time allowed for modifying part of the generator or developing the generator itself. However, the external ROM 70 may be omitted.

Also, the PC 100 can set required data for the timing generator 14, and there is no need to set the data by way of the ROM data every time a timing to drive the solid-state imaging device 11 should be changed. Accordingly, the time and trouble for designing the timing generator 14 can be saved. In addition, since the PC 100 is a computer outputting serial data, this configuration is implementable without increasing the number of terminals of the timing generator 14 so much.

Furthermore, data is transferred serially by using storage means, such as RAMs and latches, which can rewrite data and can perform high-speed reading, as an input section interfacing the external ROM 70 or PC 100 with the timing generator 14. However, once data has been transferred to the timing generator 14, validation and verification can be carried out in real time.

As in transmitting a signal between the timing generator 14 and external ROM 70, a signal is transmitted between the timing generator 14 and PC 100 when the system is powered up or while no effective pixel signals are output from the solid-state imaging device 11, e.g., a blanking interval just after a horizontal or vertical sync signal has been supplied, to eliminate the noise.

As the edge data ROM 81 and time-series data ROM 92 shown in FIG. 9, mask ROMs may be used. In a mask ROM, the logic of ROM data is determined using an interconnect material like aluminum or a semiconductor (e.g., polysilicon) and masks called "contacts" connecting two discrete parts of the material together. In the system shown in FIG. 9, the operation of the timing generator 14 is verified using the PC 100. A resultant ROM data map (described in zeros and ones) is automatically transformed into mask data at the PC 100. And the data to be written on the edge data ROM 81 and time-series data ROM 92 can be defined using this mask data. Once the data to be stored on the ROMs has been defined, the timing generator 14 can be used even while disconnected from the PC 100. That is to say, the masks of the timing generator 14 can be changed non-manually. Accordingly, it does not take so much time to convert the data, and no erroneous data will be input by mistake. As a result, it is possible to shorten the time for designing and modeling the timing generator 14.

What is claimed is:

1. A timing generator system comprising: a timing generator for generating timing pulses for use to drive a solid-state imaging device; and an external memory provided externally for the timing generator, the system being characterized in that the timing generator includes:

a first counter for performing a count operation responsive to each pulse of a vertical sync signal as a trigger;

a second counter for performing a count operation responsive to each pulse of a horizontal sync signal as a trigger;

a time-series data memory for storing first time-series data that represents a logical level repetitive pattern of an output pulse train; and edge data storage for storing first edge data that represents at what counts of the first and second counters control pulses should change their logical levels, and that the external memory stores second time-series data as an alternative to the first time-series data and second edge data as an alternative to the first edge data, respectively, and that the timing generator further includes:

means for selecting either the first or the second time-series data;

means for selecting either the first or the second edge data; and means for changing the logical levels of the control pulses when the counts of the first and second counters match the edge data selected and for outputting, as the timing pulses, results of logical operations performed on the output pulse train, represented by the time-series data selected, and the control pulses.

2. The timing generator system of claim 1, characterized in that the external memory is a ROM outputting serial data.

3. The timing generator system of claim 1, characterized in that the timing generator further comprises storage means for storing the second time-series data and the second edge data that have been supplied from the external memory.

4. The timing generator system of claim 1, characterized in that a signal is transmitted between the timing generator and the external memory only when the system is powered up or while no effective pixel signals are output from the solid-state imaging device.

5. A timing generator system comprising: a timing generator for generating timing pulses for use to drive a solid-state imaging device; and a controller connected to the timing generator, the system being characterized in that the timing generator includes:

a first counter for performing a count operation responsive to each pulse of a vertical sync signal as a trigger;

a second counter for performing a count operation responsive to each pulse of a horizontal sync signal as a trigger;

a time-series data memory for storing first time-series data that represents a logical level repetitive pattern of an output pulse train; and edge data storage for storing first edge data that represents at what counts of the first and second counters control pulses should change their logical levels, and that the controller generates second time-series data as an alternative to the first time-series data and second edge data as an alternative to the first edge data, respectively, and that the timing generator further includes:

means for selecting either the first or the second time-series data;

means for selecting either the first or the second edge data; and means for changing the logical levels of the control pulses when the counts of the first and second counters match the edge data selected and for outputting, as the timing pulses, results of logical operations preformed on the output pulse train, represented by the time-series data selected, and the control pulses.

6. The timing generator system of claim 5, characterized in that the controller is a computer outputting serial data.

7. The timing generator system of claim 5, characterized in that the timing generator further comprises storage means for storing the second time-series data and the second edge data that have been supplied from the controller.

8. The timing generator system of claim 5, characterized in that a signal is transmitted between the timing generator and the controller only when the system is powered up or while no effective pixel signals are output from the solid-state imaging device.

9. The timing generator system of claim 5, characterized in that the time-series data memory and the edge data storage in the timing generator are mask ROMs on which data, verified at the timing generator by means of the controller, has been written, and that the timing generator is operable while disconnected from the controller.

* * * * *